United States Patent
Molina et al.

(10) Patent No.: US 12,410,871 B2
(45) Date of Patent: Sep. 9, 2025

(54) DEAERATOR WITH INTEGRATED SHUT-OFF VALVE

(71) Applicant: Giacomini S.p.A., San Maurizio d'Opaglio (IT)

(72) Inventors: Samuele Molina, San Maurizio d'Opaglio (IT); Giuliano Ruga, San Maurizio d'Opaglio (IT)

(73) Assignee: Giacomini S.p.A (IT)

( * ) Notice: Subject to any disclaimer, the term of this patent is extended or adjusted under 35 U.S.C. 154(b) by 124 days.

(21) Appl. No.: 18/251,625

(22) PCT Filed: Nov. 5, 2021

(86) PCT No.: PCT/IB2021/060272
§ 371 (c)(1),
(2) Date: May 3, 2023

(87) PCT Pub. No.: WO2022/101752
PCT Pub. Date: May 19, 2022

(65) Prior Publication Data
US 2023/0417337 A1  Dec. 28, 2023

(30) Foreign Application Priority Data
Nov. 13, 2020  (IT) ........................ 102020000027191

(51) Int. Cl.
*F16K 24/04* (2006.01)
*F16K 27/02* (2006.01)
*F24D 19/08* (2006.01)

(52) U.S. Cl.
CPC ............ *F16K 24/048* (2013.01); *F16K 27/02* (2013.01); *F24D 19/087* (2013.01)

(58) Field of Classification Search
CPC ........ F16K 24/048; F16K 27/02; F16K 24/06; F16K 24/04; F16K 24/042;
(Continued)

(56) References Cited

U.S. PATENT DOCUMENTS 3,586,032 A * 6/1971 Weinstein ............. F16K 24/048
137/448
4,306,580 A * 12/1981 Wallquist ........... F02M 37/0023
137/451
(Continued)

FOREIGN PATENT DOCUMENTS

CH  423155 A  10/1966
DE  2124245 A1  11/1972
(Continued)

OTHER PUBLICATIONS

Patent Cooperation Treaty International Search Report, International application No. PCT/IB2021/060272.
(Continued)

*Primary Examiner* — Angelisa L. Hicks
(74) *Attorney, Agent, or Firm* — Widerman Malek, PL; Mark Malek; Jonathan Staudt (57) ABSTRACT

A deaerator with integrated shut-off valve comprising a detachable hollow body having a lower part of a cup-shaped body having an inlet connectable to a hydraulic manifold, and an upper part of the cup-shaped body having a vent opening. The upper part is configured to be stabilized the lower part to define a deaeration chamber. The deaerator may include a float assembly having a float element and a drive mechanism. The deaerator may further include a shutter slidingly arranged through said inlet opening of said lower portion, and a head arranged on the inner end of the body. The shutter may include a collar to block the passage of liquid through the opening when the upper part is detached from the lower part of the same body.

14 Claims, 5 Drawing Sheets

(58) Field of Classification Search
CPC ......... Y10T 137/3099; Y10T 137/7485; F24D 19/087; F04D 9/001; F16T 1/14
See application file for complete search history.

(56) References Cited

U.S. PATENT DOCUMENTS

| | | | | |
|---|---|---|---|---|
| 4,635,672 | A * | 1/1987 | Baker | F16K 24/042 |
| | | | | 137/430 |
| 5,988,201 | A | 11/1999 | Lebkuchner et al. | |
| 7,481,238 | B2 * | 1/2009 | Ramoth | F16K 24/048 |
| | | | | 137/434 |
| 2012/0211688 | A1 | 8/2012 | Carlson et al. | |

FOREIGN PATENT DOCUMENTS

| | | | | |
|---|---|---|---|---|
| DE | 2241645 | A1 | 3/1973 | |
| DE | 2755938 | A1 * | 12/1977 | |
| DE | 10261936 | A1 * | 7/2004 | ........... F16K 24/048 |
| EP | 0854310 | A1 | 7/1998 | |
| EP | 1016813 | A1 * | 7/2000 | ........... F16K 24/048 |
| EP | 1227282 | A1 * | 7/2002 | ........... F24D 19/087 |
| EP | 2607759 | A1 | 6/2013 | |
| GB | 191008218 | A * | 11/1910 | |
| GB | 976953 | A | 12/1964 | |
| IT | M20030125 | U1 | 9/2004 | |
| WO | WO-9305336 | A1 * | 3/1993 | ................ F16T 1/24 |
| WO | 2015000094 | A1 | 1/2015 | |

OTHER PUBLICATIONS

Patent Cooperation Treaty Written Opinion of the International Searching Authority, International application No. PCT/IB2021/060272.

\* cited by examiner

DEAERATOR WITH INTEGRATED SHUT-OFF VALVE

RELATED APPLICATIONS

This application is a national phase application of and claims priority under 35 U.S.C. § 371 of PCT Application Serial No. PCT/IB2021/060272 filed on Nov. 5, 2021 and titled DEAERATOR WITH INTEGRATED SHUT-OFF VALVE which in turn claims priority under Patent Cooperation Treaty Article 8 of Italian Application No. 102020000027191 filed on Nov. 13, 2020 and titled DEAERATOR WITH INTEGRATED SHUT-OFF VALVE. The content of these applications are incorporated herein by reference except for when they conflict with the content herein.

SPECIFICATION

Field of Technology

The present invention relates to a deaerator with an integrated shut-off valve.

More particularly, the present invention relates to an automatic deaerator for hydraulic and hydronic thermal systems provided with a shut-off valve integrated in the deaerator body.

State of the Art

The presence of air or gas inside pipes and circuits of hydraulic systems is a particularly well-known problem in the sectors of thermal and hydronic heating/cooling or sanitary heating systems. The accumulation of air is a phenomenon typical in any hydraulic system which, in addition to decreasing efficiency and performance, can cause deteriorating due to cavitation phenomena when it meets the moving parts of pumps or other devices.

In order to avoid this inconvenience, in the current hydraulic technique there are special types of valves called deaerators or automatic vent valves configured to automatically discharging into the outdoor environment the excess air accumulated or generated in a circuit or system during its use and without leakage of liquid from the circuit. These devices are generally provided with a cylindrical body placed in liquid connection at one end with a hydraulic manifold, a pipeline, a tank or a hydraulic device preferably at a high point, that is, at an orthometric height higher than the rest of the system where the formation of air or gas bags is more likely.

Within said body is formed a deaeration chamber wherein is slidably arranged, in the vertical direction, a float element connected by means of a rocker mechanism or rod to a vent valve or vent assembly generally located at the opposite end of the body. In the following description, vertical direction high and low, is essentially intended along the direction of application of the force of gravity.

The operation of an automatic air vent or vent valve is based on the principle of buoyancy of a body immersed in a fluid. When there is no accumulation of air or gas in the deaerator chamber, the float is held by the fluid in a raised position and the system keeps the vent valve shutter in the closed position.

The deaerator then intercepts the liquid downward from the inlet manifold into the deaeration chamber in which the micro-bubbles of air present within the liquid aggregate and accumulate at the top of the deaeration chamber by passing through drain grooves longitudinally carved on the float element.

The lowering of the buoyancy level caused by the accumulation of air in the upper part of the deaeration chamber causes the vent valve shutter to open through the rocker mechanism and the excess air to be discharged, which continues until the initial buoyancy level is restored. Once the excess air is discharged, the liquid returns to fill the deaeration chamber by pushing the float upward which returns the rocker arm to the closed position of the relief valve.

During the loading phase of the system circuit, since there is no liquid in the deaeration chamber, the float element is completely lowered and the vent valve is completely open, thus allowing the air to drain quickly. It is generally possible to manually prevent air from discharging by means of a side shutter that closes the orifice of the vent valve discharging to the outer environment.

Said well-known types of deaerators are generally provided with a body divided into several parts or elements that can be disassembled in order to be able to separate and pull out the float assembly or the vent valve for maintenance and cleaning operations.

These backflow preventers can also be provided, in correspondence with the liquid inlet opening, with a connection generally threaded for connection to piping or devices of a hydraulic circuit, but they can also be provided with a section of piping that can be oriented so as to be able to install the backflow preventer in its vertical working position, independently on a vertical or horizontal section of piping or circuit.

These deaerators can remove air from the circuit of a plant either during normal operation or during filling with liquid following a previous emptying of the hydraulic circuit plant.

A typical example of these well-known types of deaerators is shown in European Patent EP 2 607 759 (B1), which describes a float air vent valve of a de-aerator device for a heating system having a valve body defining a cavity extending along a longitudinal axis, a float slidingly housed in said cavity, a cover member for upper closure of the valve body, said member having an air vent opening, transverse to said longitudinal axis, with said cover member having a shutter for said air vent opening connected to the float. The cover member and the valve body have a first connection portion and a second connection portion defining, respectively, a rotatable joint suitable for preventing relative axial movement between the cover member and the valve body, parallel to the longitudinal axis, such as to allow, during operation of the heating system, angular adjustment of the cover member about the longitudinal axis and with respect to the valve body to orient the air vent opening in a desired manner. Said first connection portion and second connection portion also define an annular holding seat for housing holding means suitable for preventing relative axial movement and to permit angular adjustment of the cover element during valve operation.

However, these well-known types of deaerators or vent valves have drawbacks and operational limits.

A limit of operation of these well-known venting valves is due to the fact that for installations in recessed or wall-mounted systems or in confined spaces, these devices cannot have large overall dimensions, and the space for mounting and tightening with tools and utensils is often too limited.

A further important limitation of these backflow preventers is that they are very sensitive to impurities and dirt inevitably contained in the liquid of the circuits of the systems and that can cause malfunctions or even leakage of fluid.

A further limitation of these well-known deaerators is due to the fact that during maintenance and cleaning operations of the deaerator it is necessary to stop the plant or prevent the fluid from entering the deaeration chamber by means of a shut-off valve or an external tap, thus increasing the space and the elements present.

A further limitation of these known deaerators is due to the fact that in order to carry out maintenance and cleaning operations they must necessarily have more dismountable parts and therefore larger dimensions and more fluidic seals.

Object of the Invention

It is the purpose of the present invention to overcome and obviate, at least in part, the drawbacks and operational limits in of the known art mentioned above.

More particularly, an object of the present invention is to provide a user with an automatic deaerator with an integrated shut-off valve having small and compact dimensions, which is easily installed and which does not require large maneuvering space.

It is further an object of the present invention to provide the user with an automatic deaerator provided with an integrated shut-off valve capable of preventing leakage of liquid during cleaning and maintenance operations and without the need to stop the system.

It is also an object of the present invention to provide the user with an automatic deaerator having a limited number of component parts and fluid sealing elements.

It is also an object of the present invention to provide an automatic deaerator with integrated shut-off valve capable of guaranteeing a high level of resistance and reliability over time, and which can be easily and economically manufactured.

The structural and functional features of the deaerator with shut-off valve which is the subject of the present invention will be better understood by the detailed description which follows, in which reference is made to the attached figures in the drawing tables which represent some preferred and non-limiting embodiments.

DETAILED DESCRIPTION OF THE INVENTION

Figure 1A:
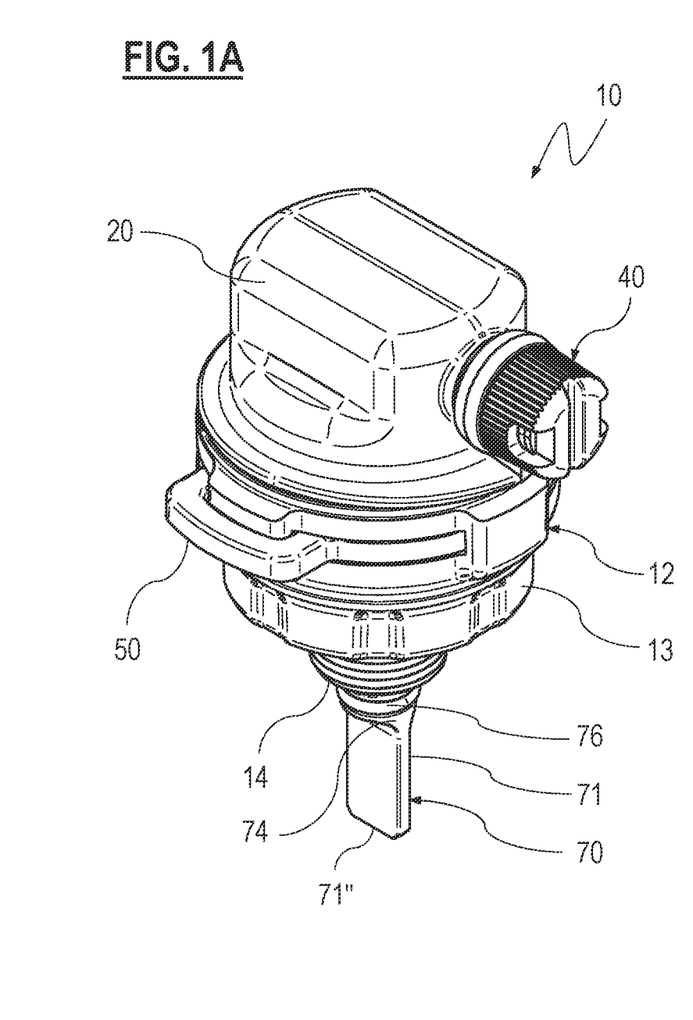
FIG. 1a is a perspective schematic representation of an embodiment of the integrated shut-off valve deaerator object of the present invention, with the vent valve arranged in a lateral direction.
Figure 1B:
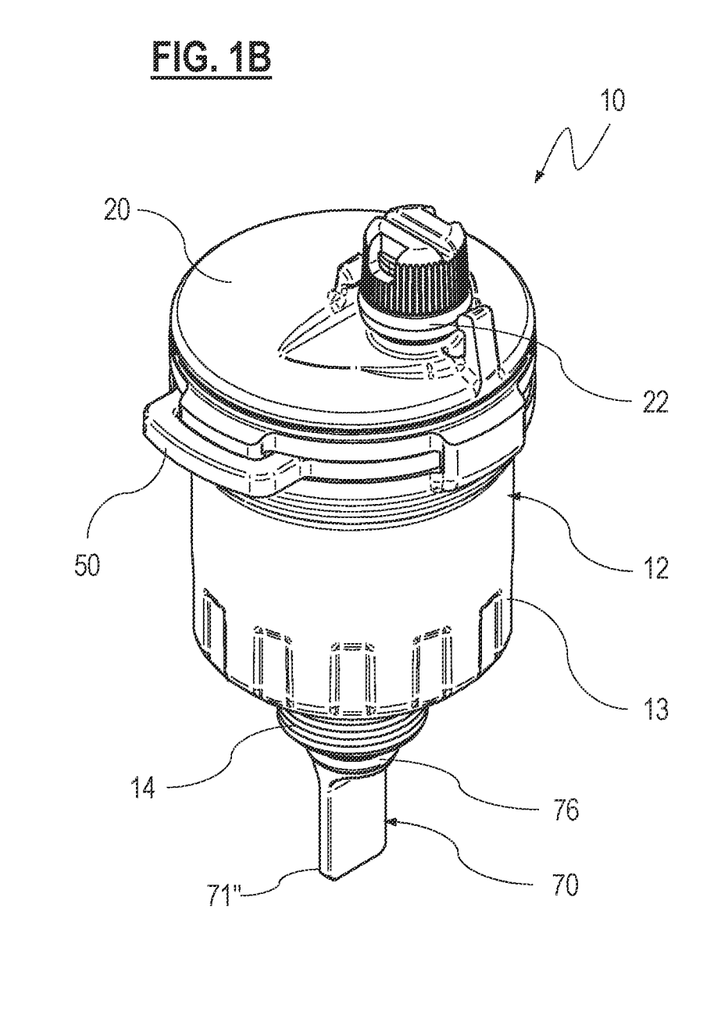
FIG. 1b is a perspective schematic representation of a further alternative embodiment of the integrated shut-off valve deaerator object of the present invention, with the vent valve arranged in a vertical direction.

With initial reference to FIGS. 1a and 1b, there is shown in two possible embodiments the deaerator with integrated shut-off valve object of the present invention and indicated in the figures by reference number 10.

In the following description, the terms upper and lower, high and low, vertical or horizontal are understood as referred according to the direction of application of the force of gravity.

With particular reference also to FIGS. 2, 3a and 4a to 5b, the deaerator 10 comprises:

- a detachable hollow body 12 made of metal, plastic, or other suitable material, said body 12 being formed by:
- a lower part 13 of the body 12 having generally a cup shape and provided in the bottom portion thereof with an inlet opening 14 suitable for connection with a hydraulic manifold,
- an upper part 20 of a body or cover having generally a cup shape and provided with a vent opening 22, said upper part 20 being suitable for be stabilized on said lower part 13 of the body 12 by known fixing means, in such a way as to define a deaeration chamber 24 within said body 12;
- a float assembly 30 comprising a float element 32 slidingly arranged in said deaeration chamber 24, said float assembly 30 further comprising a drive mechanism 34, rocker arm 34, or rod 34 arranged in cooperation of movement with said float element 32;
- a vent valve 40 stabilized on said upper part 20, said valve being suitable for be actuated by said rocker arm 34.

With reference to the same figures, said deaerator 10 comprises the innovative features of a shutter 70 slidingly arranged through the inlet opening 14 of the lower part 13 of the body 12 and comprising a shaped rod 71 apt to allow the passage of liquid through said opening 14, said shutter 70 further comprising a head 72 arranged between the inner end of the lower part 13 of said body 12 and said shutter 70, the shutter 70 being provided with a collar 74 formed on the shaped rod 71 and suitable to block the passage of liquid through said opening 14 when the upper part 20 is detached from the lower part 13 of said body 12.

Said shaped rod 71 of said shutter 70 preferably has a flat shape extending from the connecting end 71' of said rod 71 with head 72 to the free end 71" of the same shaped rod 71, but it may be shaped in any form which makes it suitable for having a portion of cross-sectional area having dimensions smaller than the minimum dimensions of inlet opening 14, so as to allow the passage of liquid longitudinally thereto when said shutter 70 is inserted through said inlet opening 14.

Said collar 74 is preferably formed or set back on the shaped rod 71 and comprises a substantially circular cross-sectional area and such as to allow it to move through the inlet opening 14 preventing the passage of liquid when said collar 74 is inserted within said inlet opening 14.

Figure 2:
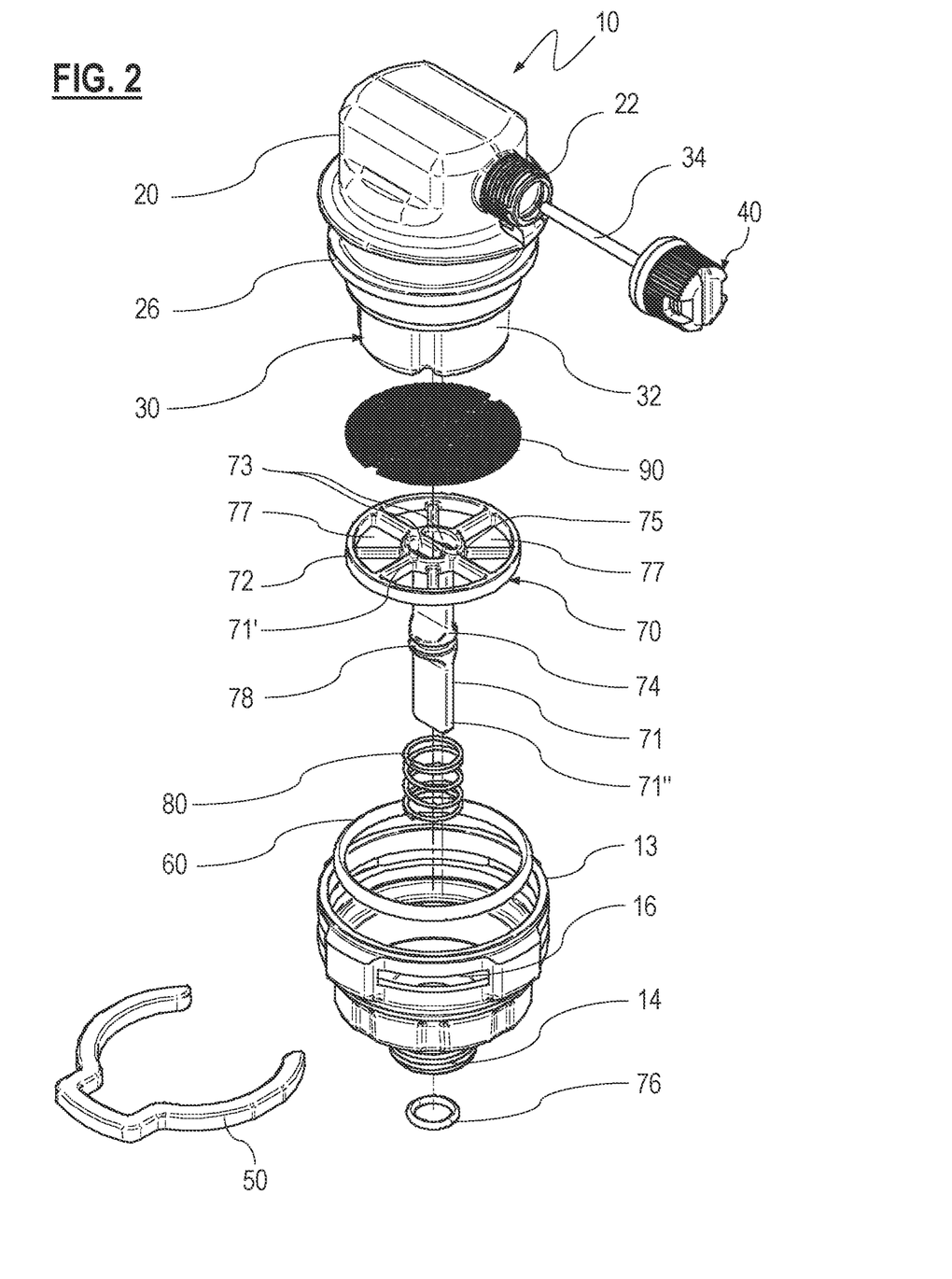
FIG. 2 is a perspective and exploded schematic representation of the embodiment form of FIG. 1a of the deaerator with integrated shut-off valve object of the present invention.
Figure 5A:
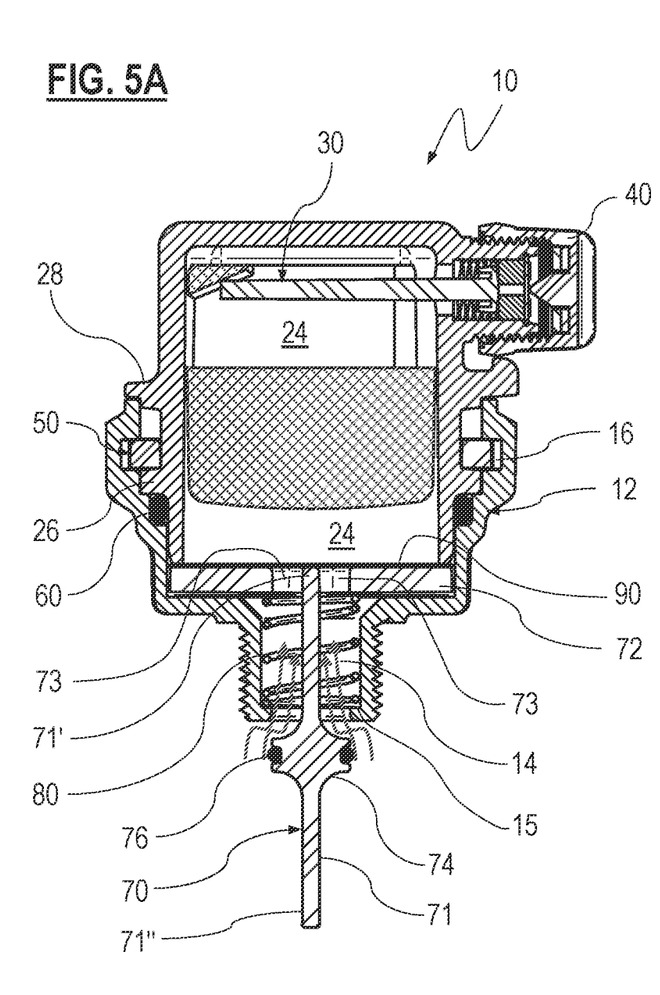
FIG. 5a is a schematic and functional perspective representation of the deaerator with integrated shut-off valve of FIG. 1a, with the top portion coupled and closed on the bottom portion of the lower part 13 and with the shut-off valve shutter open.
Figure 5B:
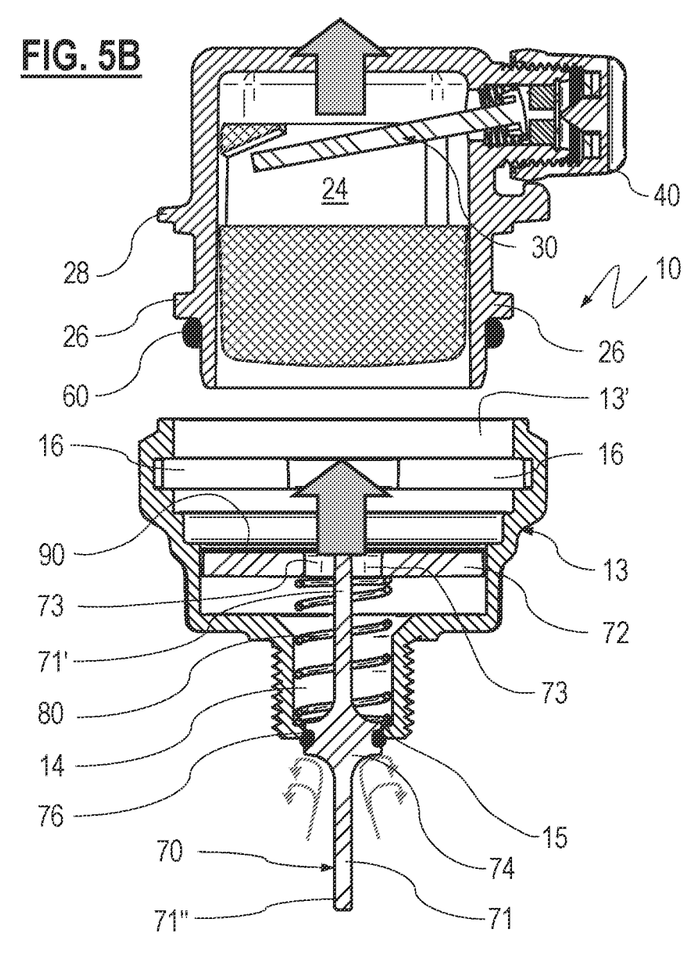
FIG. 5b is a schematic and functional perspective representation of the deaerator with integrated shut-off valve of FIG. 1a with the top portion detached from the bottom portion of the lower part 13 and the deaeration chamber open with the shut-off valve shutter closed.

With particular reference to FIG. 2, said shutter 70 may comprise a sealing ring 76 or O-ring (or circular gasket), housed in a circular seat 78 formed at said collar 74, said sealing ring 76 having an outer diametrical dimension greater than the maximum dimension of inlet opening 14, so as to ensure fluidic sealing when shutter 70 is brought into surface contact with said inlet opening 14 by means of said sealing ring 76, as shown in FIG. 5b.

Figure 3A:
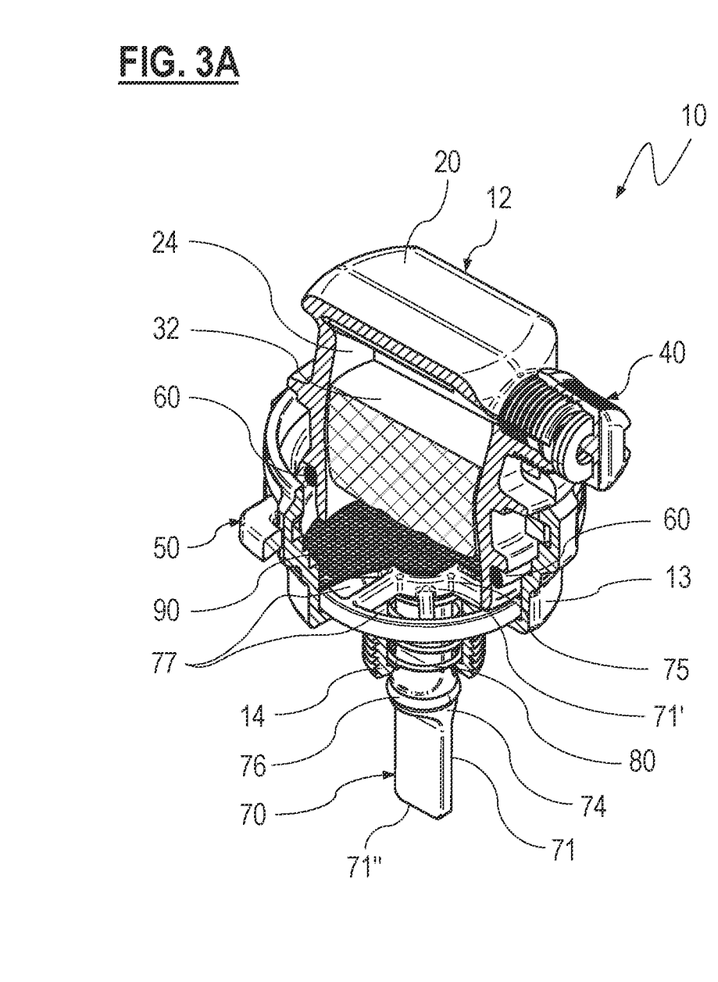
FIG. 3a is a partially sectioned perspective schematic representation of the FIG. 1a embodiment form of the deaerator with integrated shut-off valve object of the present invention.
Figure 3B:
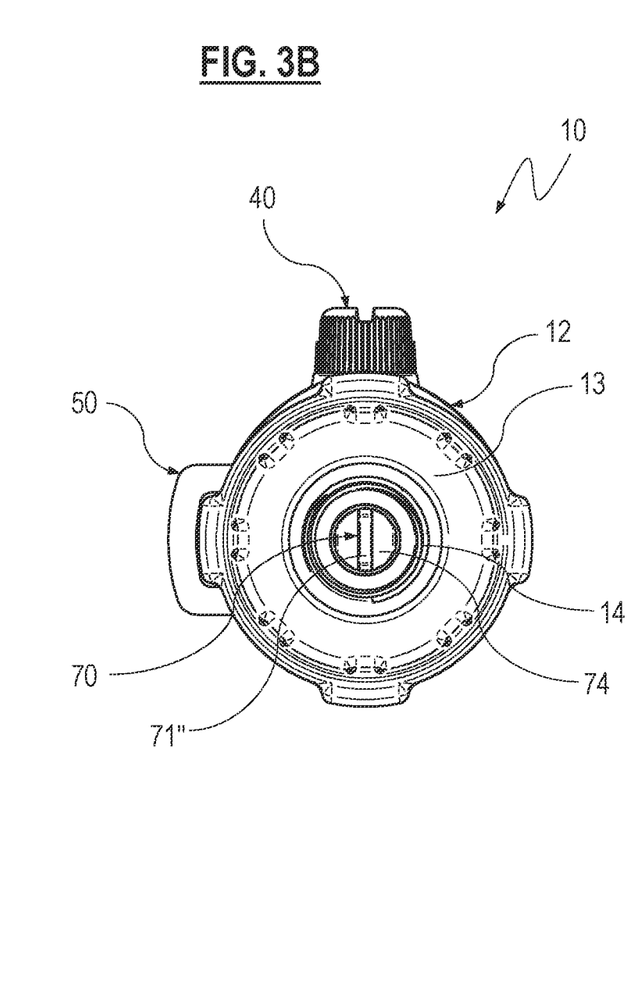
FIG. 3b is a schematic representation of an orthogonal projection view from below of the FIG. 1a embodiment form of the deaerator with integrated shut-off valve object of the present invention.
Figure 4A:
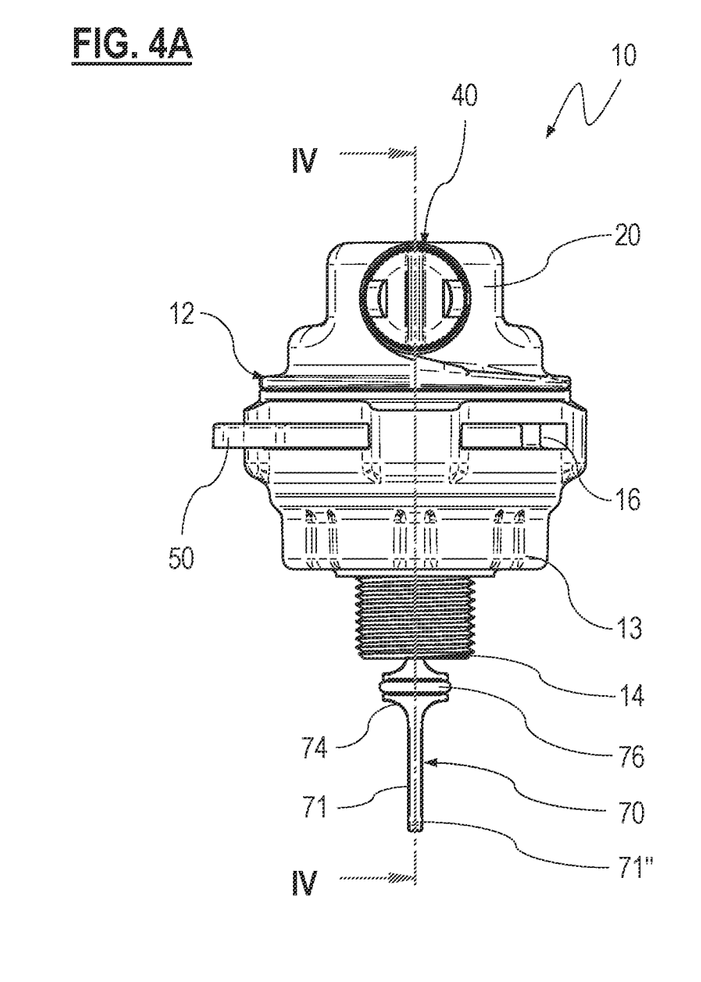
FIG. 4a is a schematic representation of a raised orthogonal projection view of the FIG. 1a embodiment form of the deaerator with integrated shut-off valve object of the present invention.
Figure 4B:
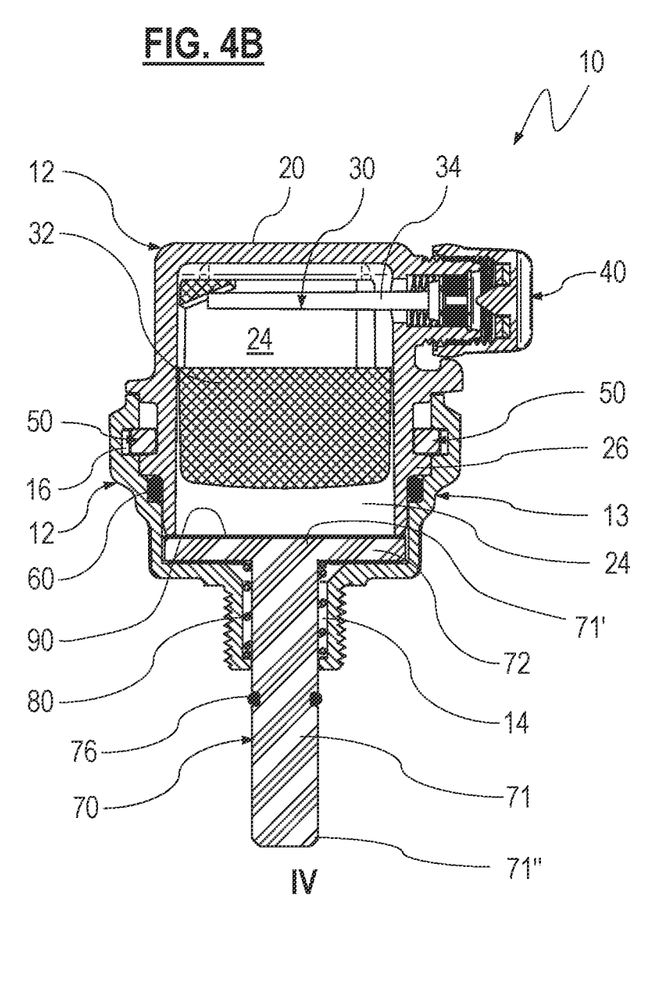
FIG. 4b is a schematic representation of a longitudinal cross section view according to axis IV of FIG. 4a of the embodiment form of FIG. 1a of the deaerator with integrated shut-off valve object of the present invention.

With particular reference now to FIGS. 2 and 3a, the head 72 of said shutter 70 may have a flange shape, with a central hub 75 of union of said head 72 with the shaped rod 71 provided with pass-through openings 73 to allow the liquid to flow into the deaeration chamber 24. The flange-shaped head 72 may also comprise at least a second through opening 77 suitable for better flowing the liquid into the deaeration chamber 24.

With reference again to FIGS. 2, 3a and 4a to 5b, the deaerator 10 object of the present invention may also advantageously comprise an elastic element 80, such as a coil spring, gas spring or other equivalent device, said elastic element 80 being suitable for holding the shutter 70 in a raised position from the body 12, pushing between the head 72 thereof and the bottom portion of the lower part 13 the body 12, so as to keep the sealing ring 76, arranged on the collar 74, in contact with the inlet opening 14 of the body 12 in such a way as to obstruct the passage of liquid to the deaeration chamber 24 of the body 12.

In a preferred embodiment, with reference particularly to FIGS. 5a and 5b, said elastic element 80 comprises a coiled spring housed in the opening 14 of the lower part 13 of the body 12 and coaxially arranged on the rod 71, said spring being suitable for operate between a support shoulder 15 and the lower face of the head 72.

The deaerator 10 object of the present invention, with reference again to FIGS. 2, 3a and 4a to 5b, may also comprise a filter, or a flat filter element 90, cup or cartridge shaped (not shown), arranged within the deaeration chamber 24 and may advantageously be arranged or supported in contact with the surface or the upper face of the head 72 of the shutter 70 facing the deaeration chamber 24, said filter element 90 being configured to translate vertically together with said shutter 70.

In an alternative embodiment, not shown, said filter element 90 may be integrated or formed directly into the flanged head 72 of said shutter 70, wherein passage apertures 73 and second openings 77, sized accordingly, may be suitable for suitable for function as filter apertures.

With reference again to the same figures, when the upper part 20 is closed and secured on the lower part 13 of the body 12, to close the deaeration chamber 24, the same upper part 20 holds down the head 72 of the shutter 70, through the filter element 90 which may function as a spacer, pushing the same shutter 70 toward the bottom portion of the lower part 13 of the body 12 together with the shaped rod 71 and collar 74 with the sealing ring 76 which disengages the inlet opening 14.

In an alternative not shown variant embodiment, said upper part 20 is suitable for press directly onto the head 72 on the shutter 70 without make contact with the filter element 90.

With particular reference also to FIGS. 1a and 1b, the discharge opening 22 of the upper part 20 may be disposed in a horizontal or vertical position, so as to be able to accommodate the vent valve 40, respectively, laterally as in FIG. 1a or upwardly as in FIG. 1b.

In the example embodiments shown in the figures, said means for fixing the upper part 20 on the lower part 13 of the body 12 may advantageously comprise a fork 50 or elastic cotter pin, preferably having a flat semi-circular shape, said fork 50 being suitable for inserting into at least one fork opening 16 formed in one of the lower or upper parts 13, 20 of said body 12.

With particular reference to FIG. 5a, said fork 50 is further suitable for being put in surface contact with a diametrical shoulder 26 preferably continuous, formed on one of the lower and upper parts 13, 20, opposite to the part on which the fork openings 16 are formed, in such a way as to rotatably stabilize the upper part 20 on the lower part 13, preventing axial sliding in the vertical direction and leaving the upper part 20, with the vent valve 40 applied to the vent opening 22, free to rotate and orient itself at 360°.

Said fastening means 50 may also be conventional removable fastening means such as threads, quick couplings, press fittings or equivalents.

With reference to the illustrative embodiments of the figures, the inlet opening 14 of the lower part 13 of the body 12 and the vent opening 22 of the upper part 20 may advantageously be provided with further second fastening means to an external manifold or hydraulic circuit or to the vent valve, respectively, said fastening means preferably comprising threads (as in the figures), but may also comprise other traditional alternative fastening means such as quick couplings, press fittings or equivalents.

With particular reference again to FIGS. 2, 3a and 4a to 5b, the deaerator 10 may further comprise an O-ring 60 or sealing gasket, typically having a circular ring shape, arranged in a relative seat formed between the upper part 20 and the lower part 13 of the body 12 when the body 12 is closed in such a way as to ensure fluidic sealing of the deaeration chamber 24.

With particular reference to FIGS. 4b to 5b, said body 12 may further provide a further positioning shoulder 28 defining a coupling stop between the upper and lower parts 20, 13 of the body 12.

From the description of the deaerator 10 of the present invention, the operation described below is showed.

The deaerator 10 of the present invention described above, is suitable for advantageously functioning as a fluid shutoff valve, preventing the inflow of fluid from the deaeration chamber when the body 12 is open or disassembled and the consequent leakage of fluid from the hydraulic circuit.

With reference to the preferred embodiment of the figures, particularly to FIGS. 5a and 5b, the deaerator 10 with integrated shut-off valve object of the present invention can be installed, through the threading at the opening 14, on a section, an end or a column of the circuit of a hydraulic thermal system, tank or other hydraulic device, in the operating configuration of FIG. 5a.

Still with reference to FIG. 5a, during operation, liquid may flow into opening 14 of lower part 13, passing around collar 74, sealing ring 76 and shaped rod 71 of shutter 70 and arrives in deaeration chamber 24 by passing through openings 73 and second openings 77 formed in head 72 of the same shutter, also passing through filtering element 90.

When it is necessary to carry out maintenance or cleaning operations of the deaerator 10, it is possible to disassemble the body 12 by separating the upper part 20 from the lower part 13 in the direction of the arrows shown in FIG. 5b.

The shutter 70, together with the filter element, is then no longer pressed by the upper part 20 and is free to translate upwards, in the direction of the arrows of FIG. 5b, said shutter 70 being pushed by the return to the rest position of the elastic element 80, thus bringing the shaped rod 71 together with the collar 74 and the sealing ring 76 to close the inlet opening 14 outwards thus preventing a leakage of liquid through the body 12 of the disassembled shutter 10, keeping the circuit or the hydraulic system in operation.

The sealing ring 76 having a size larger than the inlet opening 14 blocks further upward translation of the shutter 70 by preventing it from being projected out of the lower part 13 by the liquid pressure of the hydraulic system or circuit.

In a variant form not shown, the deaerator 10 of the present invention can also operate without the spring element 90, the liquid pressure at the collar 74 in fact pushing the shutter 70 upward, bringing it into the closed position with the sealing ring 76 in closing contact with the opening 14, as in the configuration of FIG. 5b.

The upward translation of the shutter 70 advantageously moves upwardly the head 70 thereof and the filter element toward the upper opening 13' of the open lower part 13 in a manner that facilitates cleaning or pull out of the same through said upper opening 13', as again shown in FIG. 5b.

The shutter 70 can also advantageously be pulled out, without disassembling the lower part 13 of the body 12 from its position, by simply translating the same shutter 70 toward the upper opening 13' and forcing the sealing ring 76 to compress itself by passing through the inlet opening 14.

The use of means for quickly securing the upper part 20 on the lower part 13, such as, for example, the clevis 50 inserted into the fork openings 16 and defining an undercut at the shoulder 26 such that the same upper part 20 is prevented from translating, contributes to easier and faster cleaning and maintenance operations of the deaerator 10 of the present invention.

When the deaerator 10 is assembled with the upper part 20 and closed and secured on the lower part 13, the shutter 70 is kept pressed with the lower face of the head 72 on the bottom portion of the same lower part 13, also winning the force of the elastic element 80, if any, which is compressed between the head 72 of the shutter and the supporting shoulder 15 of the inlet opening 14.

As can be seen from the foregoing, there advantages that the deaerator 10 with integrated shut-off valve object of the present invention achieves are obvious.

The deaerator 10 with integrated shut-off valve object of the present invention is particularly advantageous because it allows rapid and easy disassembly of the body 12 during maintenance and cleaning operations, without leakage of liquid, without the use of special tools or implements and without having to stop the system or close valves or taps to hydraulically isolate the same deaerator.

A further advantage of the deaerator 10 with integrated shut-off valve which is the subject of the present invention is that it is possible to pull out the shutter 70 without having to remove the lower part of the body 12 from the system or hydraulic circuit.

A further advantage of the deaerator 10 with integrated shut-off valve object of the present invention is to make available to the user a device with a filter element comprised and integrated in the valve body.

Not least advantage of the deaerator 10 with integrated shut-off valve object of the present invention is to make available to the user a device with a reduced number of components, due to the possibility of directly integrating the filter element into the shutter 70.

A further advantage of the deaerator 10 with integrated shut-off valve object of the present invention is that it makes available to the user a single device combining the functions of a shut-off valve with those of a deaerator and having reduced overall dimensions compared to devices of known art and suitable for applications on recessed or wall-mounted hydraulic systems or circuits with extremely limited space and operating dimensions.

Although the invention has been described above with particular reference to several preferred embodiments, given for illustrative and non-limiting purposes, numerous modifications and variations will be obvious to the person skilled in the art in the light of the above description. The present invention, therefore, is intended to include all modifications and variations falling with the scope of the following claims.

The invention claimed is:

1. A deaerator comprising:
a detachable hollow body comprising:
a lower part of a cup-shaped body with an inlet opening suitable for connection to a hydraulic manifold;
an upper part of a cup-shaped body provided with a vent opening, said upper part being configured to be stabilized on said lower part with means of fixing, so as to define a deaeration chamber inside said hollow body;
a float assembly comprising a float element sliding in said deaeration chamber, said float assembly further comprising a drive mechanism; and
a vent valve stabilized on said upper part, said valve being configured to be operated by said drive mechanism; and
a shutter extending through said inlet opening of the lower part; and
an elastic element to hold the shutter in a raised position from a bottom of the lower part of the hollow body;
wherein said shutter comprises a shaped rod and a head, the shaped rod configured to allow the passage of liquid through the inlet opening, and the head being arranged between an inner end of the lower part of said hollow body;
wherein the elastic element pushes between the head of the shutter and the bottom of the lower part of said hollow body; and
wherein said shutter includes a collar formed on said shaped rod, the collar configured to block the passage of liquid through the inlet opening when the upper part is in the raised position and detached from the lower part of the hollow body.

2. The deaerator according to claim 1, wherein said shaped rod of said shutter has a flat shape that extends from a connecting end of the shaped rod and connected with the head to a free end of the shaped rod so as to allow the passage of liquid longitudinally to it when said shutter is inserted through the same inlet opening.

3. The deaerator according to claim 1, wherein said collar is formed or placed on the shaped rod and comprises a substantially circular cross-section such as to allow the passage of liquid through the inlet opening.

4. The deaerator according to claim 1, wherein said shutter comprises at least one of a seal ring and O-ring, said seal ring and said O-ring having an external diametrical dimension greater than the maximum dimension of the inlet opening so as to provide fluidic sealing.

5. The deaerator according to claim 4, wherein said seal ring is housed in a circular seat formed in correspondence of said collar.

6. The deaerator according to claim 1, wherein the head of said shutter has a flange shape, with a central hub joining said head with the shaped rod and provided with openings through which the liquid can pass.

7. The deaerator according to claim 6, wherein said flange-shaped head comprises at least a second opening suitable for passage of liquid.

8. The deaerator according to claim 1, wherein said elastic element comprises a spiral spring, gas spring or other equivalent device.

9. The deaerator according to claim 8, wherein said elastic element comprises a spiral spring housed in the inlet opening of the lower part and placed coaxially on the shaped rod, said spiral spring being configured to operate between a supporting shoulder and a lower face of the head.

10. The deaerator according to claim 1, further comprising a filter element placed inside the deaeration chamber.

11. The deaerator according to claim 10, wherein said filter element is placed in contact with a surface or upper face of the head of the shutter facing the deaeration chamber, and wherein said filter element being configured to move vertically together with said shutter.

12. The deaerator according to claim 10, wherein said filter element is integrated or formed directly in the flange head of the shutter.

13. The deaerator according to claim 10, wherein said filter element has at least one of a flat shape and a cup shape.

14. The deaerator according to claim 1, wherein said means of fastening the upper part on the lower part comprising a fork having a flat semi-circular shape, the fork being configured to fit into at least one fork opening extending into at least one of the lower and the upper parts of said hollow body.

* * * * *